UNITED STATES PATENT OFFICE.

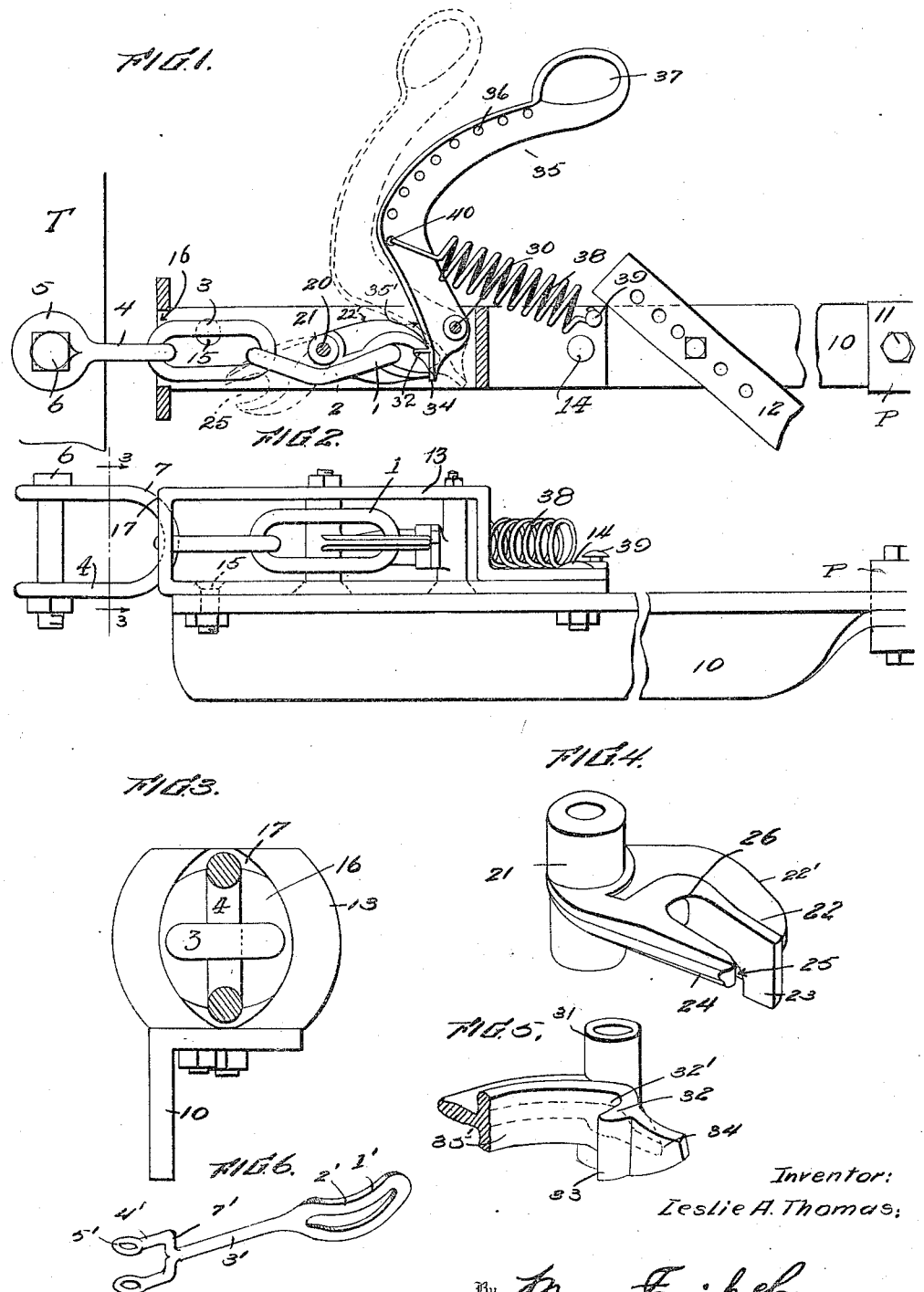

LESLIE A. THOMAS, OF EVANSVILLE, INDIANA, ASSIGNOR TO THE VULCAN PLOW CO., A CORPORATION OF INDIANA.

SPRING-TRIP HITCH.

1,193,311.   Specification of Letters Patent.   Patented Aug. 1, 1916.

Application filed January 20, 1916. Serial No. 73,244.

*To all whom it may concern:*

Be it known that I, LESLIE A. THOMAS, a citizen of the United States, residing at Evansville, in the county of Vanderburg and State of Indiana, have invented certain new and useful Improvements in Spring-Trip Hitches; and I do hereby declare the following to be a full, clear, and exact description of the invention, such as will enable others skilled in the art to which it appertains to make and use the same.

My invention is described in the following specification as a device relating to plows, and more especially to their couplings, although it might readily be employed on other agricultural machines than plows, or in fact on machines which were not necessarily used in agriculture. Its object is to produce a coupling by means of which the plow or other machine may be attached to the tractor or other source of power in such manner that the machine may be drawn forward or backed; and that if, when progressing forward, the plow strikes an obstruction, the coupling will yield so as to disconnect it from the motor vehicle and prevent an accident. It is in effect a spring trip hitch by means of which the machine is hitched to the power by a coupling whose trip or latch is held by a spring.

Details of the preferred manner of carrying out the invention are set forth in the following specification and claims, reference being had to the drawings wherein Figure 1 is a plan view partly in section, and Fig. 2 a side elevation of this improved coupling in place. Fig. 3 is an enlarged front elevation of the draw bar, being a section through the clevis or shackle on about the line 3—3 of Fig. 2. Figs. 4 and 5 are perspective details of the knuckle and latch respectively, and Fig. 6 a perspective detail of another form of the link.

In the illustration herewith the letter P is used broadly to designate a plow in the present instance although, as above suggested, it might be some other machine; and the letter T is employed to designate the rear bar of a traction engine, although this also could be another source of power. My improved spring trip hitch or coupling is disposed between these two instrumentalities, and will by preference be made entirely of metal and of a size and strength sufficient to withstand the strain which will ordinarily be thrown upon it.

Coming now to the detailed description of parts, the numeral 1 designates a link preferably bent slightly as shown at 2, the numeral 3 designates a second or connecting link engaged with the front end of the first link, and the numeral 4 designates in the present instance a shackle or clevis whose bend is engaged with the front end of the second link and whose eyes 5 are secured to the tractor as by bolt 6. I might here say that the structure shown in Fig. 6 and bearing the same reference numerals with prime marks added, is a substitute for that already described and differs from it only in that the intermediate link loosely connecting the endmost members is in this view replaced by a rigid stem 3′ which performs the same function. However, this draft element might be attached in any other suitable way to the tractor or draft member T. The other element of this coupling is formed in the nature of a draw bar comprising a beam 10 which may be of angle iron as seen in Fig. 3, and whose rear end is connected at 11 with the plow P or other machine, this beam possibly being braced as indicated at 12; and an open head 13 mounted upon the beam as by bolts 14 and 15. Said head may well be made of strap iron bent into the shape best shown in Fig. 2, with its front end provided with a mouth 16, either round or oval, with its longest axis upright as seen in Fig. 3. At the top and bottom of said mouth are shoulders 17 against which corresponding shoulders or parts 7 or 7′ of the forward member or shackle of the draft element abut when the tractor is backed. In other words, it is quite possible to back the traction engine, which drives the clevis 4 into the mouth 16 and therefore pushes the entire draw bar to the rear, and this in turn backs the plow. It is often desirable to back up the plow or other machine for a short distance, and the construction of my device whereby this is rendered possible is one of the features of the present invention.

Mounted on an upright pivot 20 within the head 13 is the boss 21 of a knuckle best seen in Fig. 4. Said boss supports the body of the knuckle about midway between the top and bottom bars of the head as seen in Fig. 2 and permits it to swing in a horizontal plane therein. The knuckle-body comprises an inner jaw 22 having a depending lip 23, and an outer jaw 24 spaced from the inner jaw so as to produce a mouth 25 which is of a size to freely receive the inner end of the inner link 1; and when said end lies in the rear part 26 of the mouth and the sides of the link inclose the outer jaw 24 as seen in Fig. 1, the band 2 of the link passes around the boss 21 above and below the knuckle. So long as the knuckle remains with its mouth opening to the rear, the draft element is connected with the draw bar, but as soon as this knuckle is released and allowed to swing around to the position shown in dotted lines in Fig. 1 it is quite obvious that the link will be disengaged therefrom and drawn out of the draw bar entirely.

Mounted on a vertical bolt 30 within the head 13 is a boss 31 which carries the latch best seen in Fig. 5 and spaces it about midway between the upper and lower bars of the head so that it may swing in a horizontal plane. This latch includes a hook whose bill 32 is adapted to engage the tip of the inner jaw 22. The working face of said bill stands at an acute angle to the working face 35' of the shank of the hook, but the throat 32' of the latter is yet of ample size to loosely receive the end of the inner jaw 22 as well as its strengthening web 22', as seen in Fig. 1. The bill 32 also is made rather wide as shown at 33 so that it may have a firm engagement with the lip 23, and a nose 34 projects beyond the hook for engaging the tip of the outer jaw 24 so that the mouth 25 of the knuckle is completely closed as seen in Fig. 1. Said shank is continued into a lever 35 of about the shape shown in Fig. 1, extending to one side of the coupling, pierced with a number of holes 36, and preferably having a loop-shaped handle 37. A strong coiled spring 38 is connected at the point 39 with the head 13, and at its forward end has a hook 40 for engagement with one of the holes 36. Obviously when this hook is adjusted farther from the pivot 30 it will throw the working end of the latch against the knuckle with correspondingly greater force.

The draft element being connected with the tractor and the beam 10 with the plow, the lever 35 is borne forward to cause the latch to release the knuckle, the link 1 passed through the mouth 16 and engaged with such knuckle, the latter turned to the rear as seen in Fig. 1, and the latch moved into engagement with the knuckle where it is held by the tension of the spring 38. Such last movement of the latch is effected by the contraction of the spring 38, and as it swings on its pivot 30 the face of its shank 35' contacts with the edge of the web 22' on the knuckle and swings the latter on its pivot 20—the result being that just when the tip of the jaw 22 comes to rest in the throat 32' the inner or rear part 26 of the mouth 25 of the knuckle is beyond a straight line of draft through the centers of the parts 6, 20 and 14 in Fig. 1. In said view the knuckle throat, and therefore the rear end of the link 1, are below such a straight line of draft so that tension has a tendency to swing the knuckle from the full to the dotted line position. The spring 38 will be of a strength and the parts so proportioned that this improved coupling or spring hitch will resist a strain of substantially 2500 lbs. when the hook 40 stands in the innermost hole 36, and said holes may be so spaced that for each adjustment the spring increases the power of resistance by 50 lbs., although I would not be limited in this respect. When the tractor is started forward it draws the plow with it, but should the plow encounter a stump, a rock, or some other obstruction which suddenly increases the resistance to a point above 2500 lbs., the tendency of the tip of the jaw 22 to swing laterally around its pivot and release the link 1 becomes sufficient to overcome the spring 38, so that the entire latch moves to the dotted position in Fig. 1, the hook 32 disengages the knuckle, the latter swings also to its dotted position, and the draft element is released. The tractor then moves forward without the plow, and immediate notice is given to the engineer and attendant. The tractor is stopped and backed, again coupled to the plow, and possibly the latter also backed a little to disengage it from the obstruction; after which the tractor may be started forward at a slight angle so as to carry the plow around the obstruction, and all will be well. If some other and heavier machine is used in place of a plow or if it is a gang of plows or machines, it may be found desirable to adjust the hook 40 of the spring into one of the other holes 36. The use of the single draft element shown in Fig. 6 instead of the chain-like draft element shown in Figs. 1 and 2, is obvious.

What I claim is:

1. In a coupling of the class described, the combination with a beam for attachment to a machine, a draw bar connected to said beam and having an open mouth with spaced shoulders, a knuckle pivoted in said draw bar and having a jaw, and yielding means for holding the knuckle in position with its jaw projecting away from said mouth; of a draft element including a clevis larger than said mouth and having shoulders adapted to contact with those in the mouth, a link whose rear end is removably held by said jaw, and connections between the clevis and link.

2. In a coupling of the class described, the combination with a draw bar having an open head provided with a mouth at its front end, a pivot across said head in line with the center of its mouth, a knuckle mounted at one end on said pivot and having a pair of jaws at its other end, and yielding means for holding said knuckle behind such pivot with its jaws in position to project away from said mouth; of a draft element adapted to pass into said mouth and including a link bent transversely to pass around said pivot when its inner end is engaged between said jaws.

3. In a coupling of the class described, the combination with an open draw head having a mouth at its front end, a pair of upright pins through said head, a knuckle having a boss at one end mounted on the forward pin and a pair of jaws at its other end, and a latch having a boss pivoted on the rearward pin, a hook to engage one of said jaws, and a lever projecting out of the draw head; of yielding means for moving the lever in a direction to engage the hook with one jaw, and a draft element including a link having its body passing the boss of the knuckle when its rear end lies between said jaws.

4. In a coupling of the class described, the combination with an open draw head, two pivot pins therethrough, a knuckle mounted on the forward pin, and a latch mounted on the rearward pin and having a hook adapted to engage the free end of said knuckle, and a lever projecting out of the draw head and provided with a series of holes; of a spring connected at one end to the draw head and having a hook at its other end, and a draft element having at one end a link adapted to pass the pivot of the knuckle and engage its jaw while the latter is engaged with said hook.

5. In a coupling of the class described, the combination with a frame-like draw head having a mouth at its front end, a U-shaped knuckle pivoted near its bend within said head and its arms constituting jaws spaced to form a mouth, and a draft element leading through the mouth of the head and having at its rear end a link adapted to enter the mouth of the knuckle; of a latch mounted on another pivot in said head and having at its inner end a hook to engage one jaw and a nose extending across the jaw-mouth and engaging the other jaw, the latch having a lever projecting beyond the head, and yielding means for swinging the lever to the rear and engaging the latch with the knuckle.

In testimony whereof I affix my signature in presence of two witnesses.

LESLIE A. THOMAS.

Witnesses:
JOHN H. BERRYHILL,
FRED E. HAND.

Copies of this patent may be obtained for five cents each, by addressing the "Commissioner of Patents, Washington, D. C."